United States Patent
Lee et al.

(10) Patent No.: US 8,116,584 B2
(45) Date of Patent: Feb. 14, 2012

(54) ADAPTIVELY DE-BLOCKING CIRCUIT AND ASSOCIATED METHOD

(75) Inventors: Wei-Kuo Lee, Hsinchu Hsien (TW); Chien-Chih Chen, Hsinchu Hsien (TW); Shih-Chang Lai, Hsin-Chu (TW); Hsiang-Chun Lin, Hsinchu Hsien (TW)

(73) Assignee: Mstar Semiconductor, Inc., Hsinchu Hsien (TW)

( * ) Notice: Subject to any disclaimer, the term of this patent is extended or adjusted under 35 U.S.C. 154(b) by 1067 days.

(21) Appl. No.: 12/007,458

(22) Filed: Jan. 10, 2008

(65) Prior Publication Data

US 2008/0166060 A1 Jul. 10, 2008

Related U.S. Application Data

(60) Provisional application No. 60/884,224, filed on Jan. 10, 2007.

(51) Int. Cl.
*G06K 9/40* (2006.01)

(52) U.S. Cl. .................................................. 382/268
(58) Field of Classification Search .............. 382/268, 382/199
See application file for complete search history.

(56) References Cited

U.S. PATENT DOCUMENTS

| 5,555,028 A * | 9/1996 | Kim .......................... 348/607 |
| 2007/0058726 A1* | 3/2007 | Ha et al. .................... 375/240.24 |
| 2009/0016442 A1* | 1/2009 | Shankar et al. ........... 375/240.24 |

* cited by examiner

*Primary Examiner* — Jon Chang
(74) *Attorney, Agent, or Firm* — WPAT, PC; Justin King

(57) ABSTRACT

The present invention discloses an adaptively de-blocking circuit and associated method. A mean is derived according to the neighboring pixels surrounding a central pixel of an image. A blending factor is determined according to a flatness of the image. An updated pixel value of the central pixel is determined by blending the original pixel value of the central pixel and the mean according to the blending factor. Finally, alternatively output the updated pixel value and the original pixel value of the central pixel in response to a block border signal.

15 Claims, 4 Drawing Sheets

ADAPTIVELY DE-BLOCKING CIRCUIT AND ASSOCIATED METHOD

CROSS REFERENCE TO RELATED APPLICATIONS

This application claims the right of priority based on U.S. Provisional Patent Application 60/884,224 entitled "Adaptively De-Blocking Circuit and Associated Method", filed on Jan. 10, 2007, which is incorporated herein by reference and assigned to the assignee herein.

FIELD OF INVENTION

The present invention relates to an image block border processing, and more particularly to an adaptively de-blocking circuit and the associated method.

BACKGROUND OF THE INVENTION

In the digital video signal processing, generally the digital video signal will be encoded and compressed for the high-speed transmission in a bandwidth-limited channel. For example, MPEG is a block-based video compression format for the foregoing purpose.

After the encoding and compressing, the video signal is transmitted through the transmission channel to a decoder. The decoder decodes and decompresses the video signal. However, an annoying block border effect occurs after reconstructing the video signal by the decoder. A user can observe block borders since the source image signal is encoded on a block-by-block basis. Conventionally, a low pass filter is used to eliminate the block border effect; however, many details of image are lost.

Therefore it is desirable to have an adaptively de-blocking circuit and associated method

SUMMARY OF THE INVENTION

The present invention is to provide an adaptively de-blocking circuit and associated method. When the current pixel lies on the block border, the neighboring pixels around the current pixel are referenced to adaptively adjust the current pixel. The adjustment depends on a flatness of the neighboring pixels. When the current pixel lies on the block border, the mean of the neighboring pixels is applied to adaptively adjust the current pixel in response to the flatness. Therefore, the image details and texture are improved.

The foregoing and other features of the invention will be apparent from the following more particular description of embodiment of the invention.

BRIEF DESCRIPTION OF THE DRAWINGS

The present invention is illustrated by way of example and not intended to be limited by the accompanying drawings.

DETAILED DESCRIPTION

Figure 1:
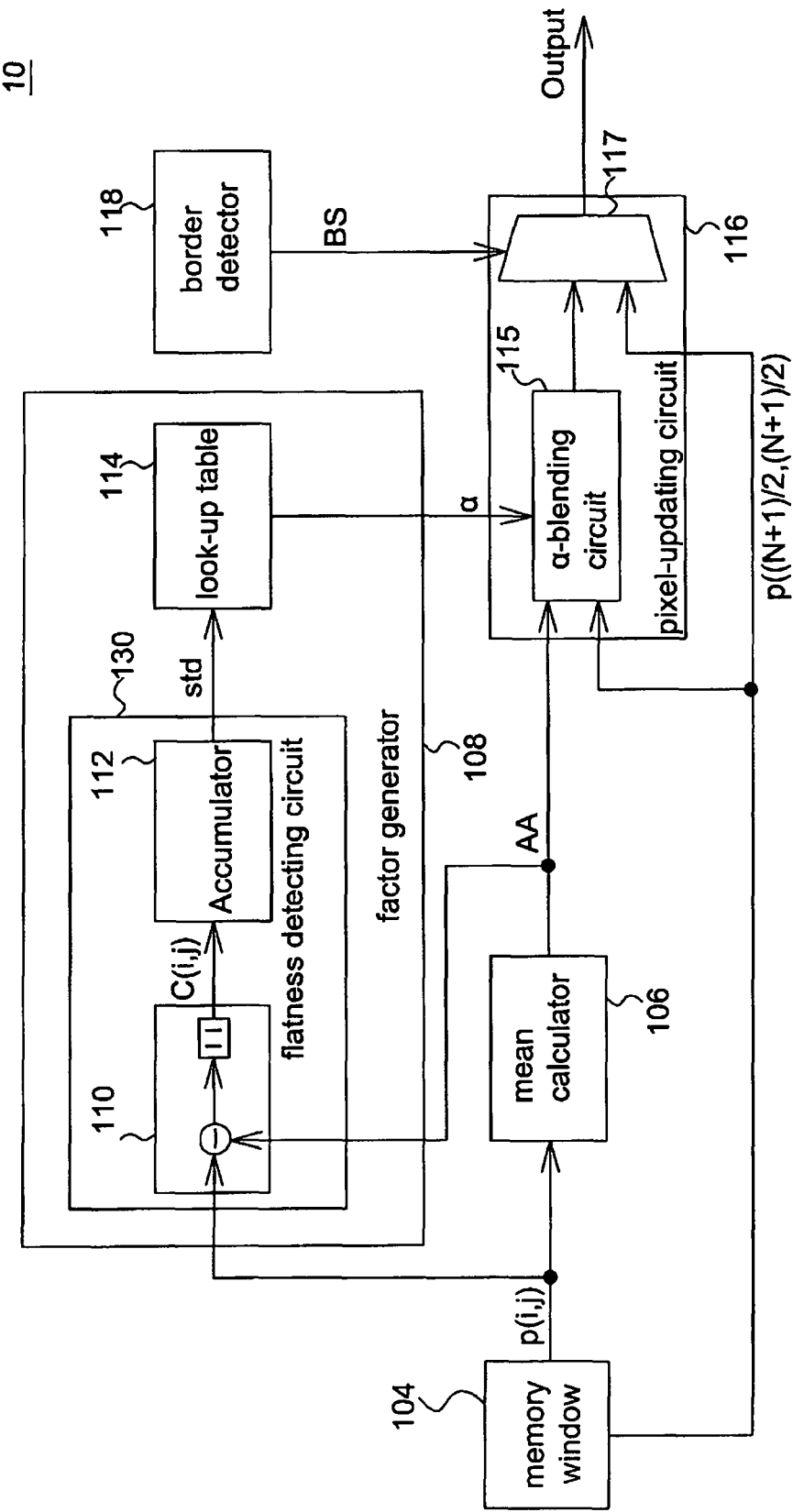
FIG. 1 is a schematic block diagram of an adaptively de-blocking circuit according to an embodiment of the present invention.

FIG. 1 is a schematic block diagram of an adaptively de-blocking circuit 10 according to an embodiment of the present invention. The de-blocking circuit 10 includes a memory window 104, a mean calculator 106, a factor generator 108, a pixel-updating circuit 116, and a border detector 118. It's preferred to integrate the de-blocking circuit 10 into a single IC chip, for example, a display control chip.

The de-blocking circuit 10 shown in FIG. 1 can be implemented in a display device, e.g., an LCD device; or the de-blocking circuit 10 can be incorporated into a DVD player or a computer graphic card (not shown).

It's preferred to apply the de-blocking circuit 10 to process a decoded MPEG video signal received from an MPEG video decoder (not shown); also it's preferred to provide a line buffer (not shown) before the de-blocking circuit 10 to temporarily store the decoded pixel data of a plurality of scan lines. Memory window 104 reads out N×N pixel matrix data from the temporarily stored pixel data. For example, the memory window 104 can be implemented by a plurality of flip-flops, and it should be noted that an M×N pixel matrix can also be applied in the present invention, where M, or N is an odd greater than 2.

Figure 2:
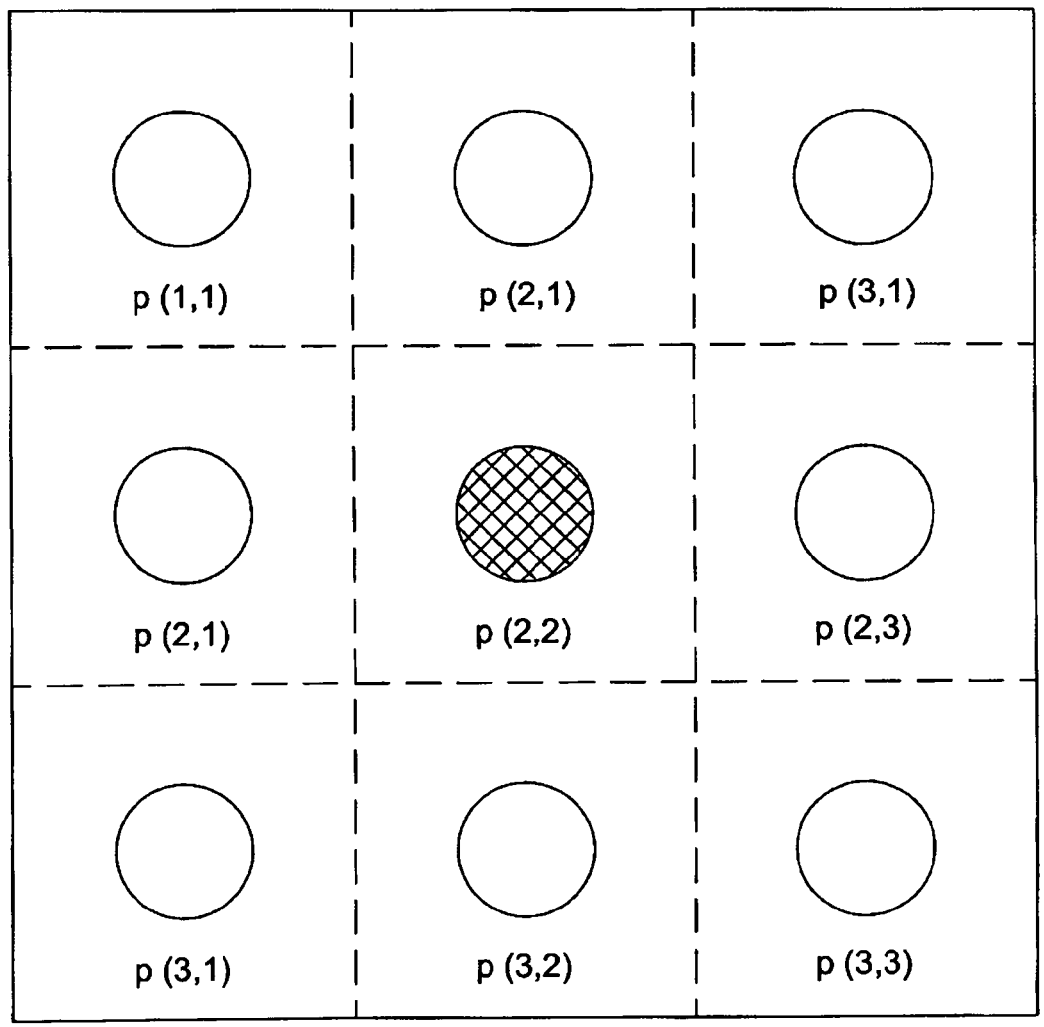
FIG. 2 illustrates the 3×3 pixel matrix read out from the memory window 104 of FIG. 1.

FIG. 2 illustrates an embodiment of a 3×3 memory window, where each pixel has a pixel value $p(i, j)$, where i=1 to 3, j=1 to 3. Each pixel value represents R, G or B value in the R-G-B color space, where R, G and B value is an integer, e.g. between 0 and 255. Alternatively, a pixel value $p(i, j)$ represents Y, U and V value of a pixel in the Y-U-V color space, or a pixel value $p(i, j)$ represents Y, Cb and Cr value of a pixel in the Y-Cb—Cr color space. Those skilled in the art conceive transformation among different color spaces, and herein no further details are given. The pixel values presented in other color spaces known to those skilled in the art or in gray scale are also covered by the present invention.

Referring to FIG. 1 again, a mean calculator 106 is coupled to a memory window 104 for calculating a mean, AA, according to the pixel values of the neighboring pixels from the 3×3 pixel matrix. In this embodiment, the neighboring pixels include pixel $p(i, j)$, where I=1 to 3, j=1 to 3 and exclude the central pixel $p(2,2)$. The mean calculator 106 calculates the arithmetic mean of $p(1,1)$, $p(1,2)$, $p(1,3)$, $p(2,1)$, $p(2,3)$, $p(3,1)$, $p(3,2)$, and $p(3,3)$ as the mean AA. Moreover, geometric mean, median or mode can also be applied to the mean AA in the present invention. Preferably, the neighboring pixels are the all pixels except the central pixel $((N+1)/2, (N+1)/2)$. The mean calculator 106 calculates the arithmetic mean of the all pixels except the central pixel $((N+1)/2, (N+1)/2)$ as the mean AA.

The factor generator 108 determines an adjusting factor α, according to the mean AA, and a plurality of neighboring pixels. In this embodiment, the factor generator 108 includes a flatness detecting circuit 130 and a look-up table 114. The flatness detecting circuit 130 detects a flatness value, std, of an image stored in the memory window 104; the look-up table 114 outputs the factor α, according to the flatness value, std. For example, the flatness detecting circuit 130 includes a difference circuit 110 and an accumulator 112. The difference circuit 110, coupled to the mean calculator 106 and the memory window 104, reads out the 3×3 pixel matrix data and calculates the absolute difference $C(i,j)$:

$$C(i,j)=|p(i,j)-AA|$$

The accumulator 112, coupled to the difference circuit 110, accumulates $C(i,j)$ to get the flatness value, std:

$$std=\Sigma C(i,j)=\Sigma|p(i,j)-AA|$$

In this embodiment, a small flatness value std represents a small difference among the neighboring pixels; i.e., N×N pixel matrix represents a flat image.

The look-up table 114 is coupled to the accumulator 112. The factor α can be generated by referencing the look-up table 114 according to the flatness value, std. Alternatively, in addition to the look-up table 114, the factor generator 108 can further apply an interpolation circuit (not shown) to interpolate the factor α. Preferably, the factor α is between 0 and 1, and the look-up table 114 is configured to output a large factor α for a small flatness value std, which represents a flat image.

The pixel-updating circuit 116, coupled to the memory window 104, the mean calculator 106 and the factor generator 108, receives the original pixel value of pixel ((N+1)/2, (N+1)/2), the mean AA, and the factor α, and calculates an updated pixel value for the pixel ((N+1)/2, (N+1)/2) according to the factor α. Take the 3×3 memory window in FIG. 2 for example; the pixel-updating circuit 116 receives the original pixel value of pixel (2,2), the mean AA, and the factor α to calculate the updated pixel value for pixel (2,2).

In this embodiment, assume the original pixel value for the central pixel ((N+1)/2, (N+1)/2) is A. The pixel-updating circuit 116 can calculate the updated pixel value A' of the central pixel ((N+1)/2, (N+1)/2) by an α blending operation, wherein A'=α*AA+(1−α)*A and the factor α is between 0 and 1. As mentioned, a larger flatness value std corresponds to a smaller factor α. When the absolute differences among the neighboring pixels are larger, the central pixel ((N+1)/2, (N+1)/2) is considered as an inherent line or texture of the image, and a smaller α is chosen to perform a slight adjustment for the central pixel ((N+1)/2, (N+1)/2) in order not to destroy the inherent image details. For example, when the factor α is 0, it represents that the central pixel may constitute a line, and the updated pixel value A' should be equal to the original pixel value A. Therefore the original pixel value is maintained and the line is not blurred. When the factor α is 1, it represents that the central pixel constitutes a flat area and the updated pixel value A' should be the mean AA. Therefore the block effect can be eliminated.

The border detector 118 detects the block border for the images. Methods to detect the block border are known to those skilled in the art and thus omitted thereinafter. The border detector 118, coupled to the pixel-updating circuit 116, determines whether the central pixel ((N+1)/2, (N+1)/2) lies on the block border and signals the pixel-updating circuit 116 whether the central pixel ((N+1)/2, (N+1)/2) is on the block border by a block border signal BS. For example, the block border signal BS is a digital signal, wherein the low level indicates the central pixel ((N+1)/2, (N+1)/2) is not on the block border and the high level indicates the central pixel ((N+1)/2, (N+1)/2) is on the block border.

Preferably, the pixel-updating circuit 116 contains an α-blending circuit 115 and a multiplexer 117. The α-blending circuit 115 receives the mean AA and the pixel value of the central pixel and performs the α blending operation to output the updated pixel value according the factor α. The multiplexer 117 alternatively outputs the updated pixel value or the original pixel value of the central pixel ((N+1)/2, (N+1)/2), in response to the block border signal BS. For example, when the block border signal BS is high, the multiplexer 117 outputs the updated pixel value; when the block border signal BS is low, the multiplexer 117 outputs the original pixel value of the pixel ((N+1)/2, (N+1)/2).

Preferably, the de-blocking circuit 10 is implemented in a display controller. The display controller contains a line buffer (not shown) to temporarily store the pixel data of a plurality of scan lines. Those skilled in the art can understand that the display controller processes images for the display, wherein each image is processed from the left top to the right bottom, pixel by pixel, and line by line. The display controller processes the pixels from the line buffer. The currently processed pixel is the central pixel mentioned in the above embodiments. When the current pixel appears on the block border, adaptive de-blocking is performed accordingly.

Figure 3:
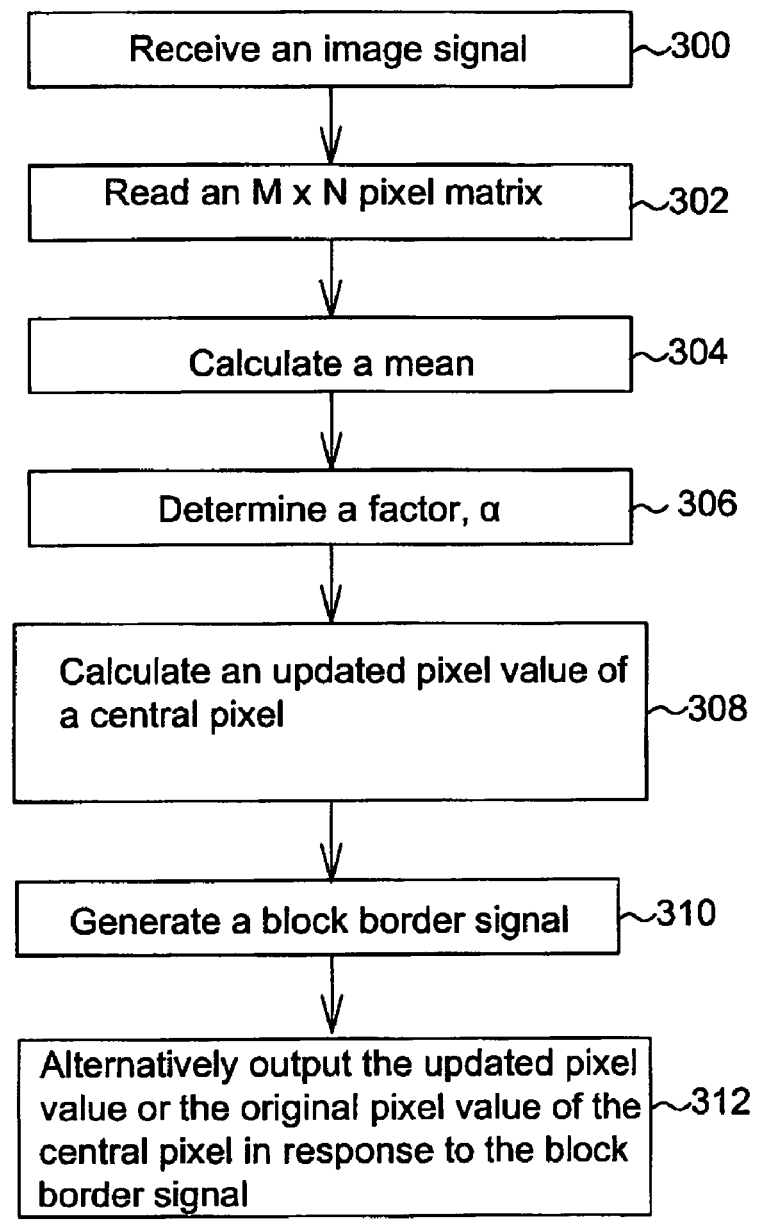
FIG. 3 is a flow chart of an adaptively de-blocking method according to an embodiment of the present invention.

FIG. 3 is a flow chart of an adaptively de-blocking method according to an embodiment of the present invention. At Step 300, an image signal is received. Preferably, an MPEG decoded signal. Step 302 reads an M×N pixel matrix from the received image signal, where M, N is an odd value greater than 2. Preferably, M is equal to N, and each pixel of this N×N matrix has a pixel value p(i,j), where i=1 to N, j=1 to N. For example, an N×N matrix is a 3×3 pixel matrix.

Step 304 calculates a mean AA according to the neighboring pixels in the N×N matrix. The neighboring pixels include pixel (i,j), where i=1 to N, j=1 to N but exclude the central pixel. Take FIG. 2 for example. The mean AA is calculated according to pixels (1,1), (1,2), (1,3), (2,1), (2,3), (3,1), (3,2), and (3,3). In other words, preferably, the neighboring pixels contain all the pixels except the central pixel. The mean AA can be an arithmetic mean, a geometric mean, or a median.

Step 306 determines a factor α according to the flatness of the image presented by the N×N pixels. When the N×N pixel matrix is determined as a flat image, the factor α is larger. When the N×N pixel matrix is determined as lines or textures, the factor α is smaller.

Figure 4:
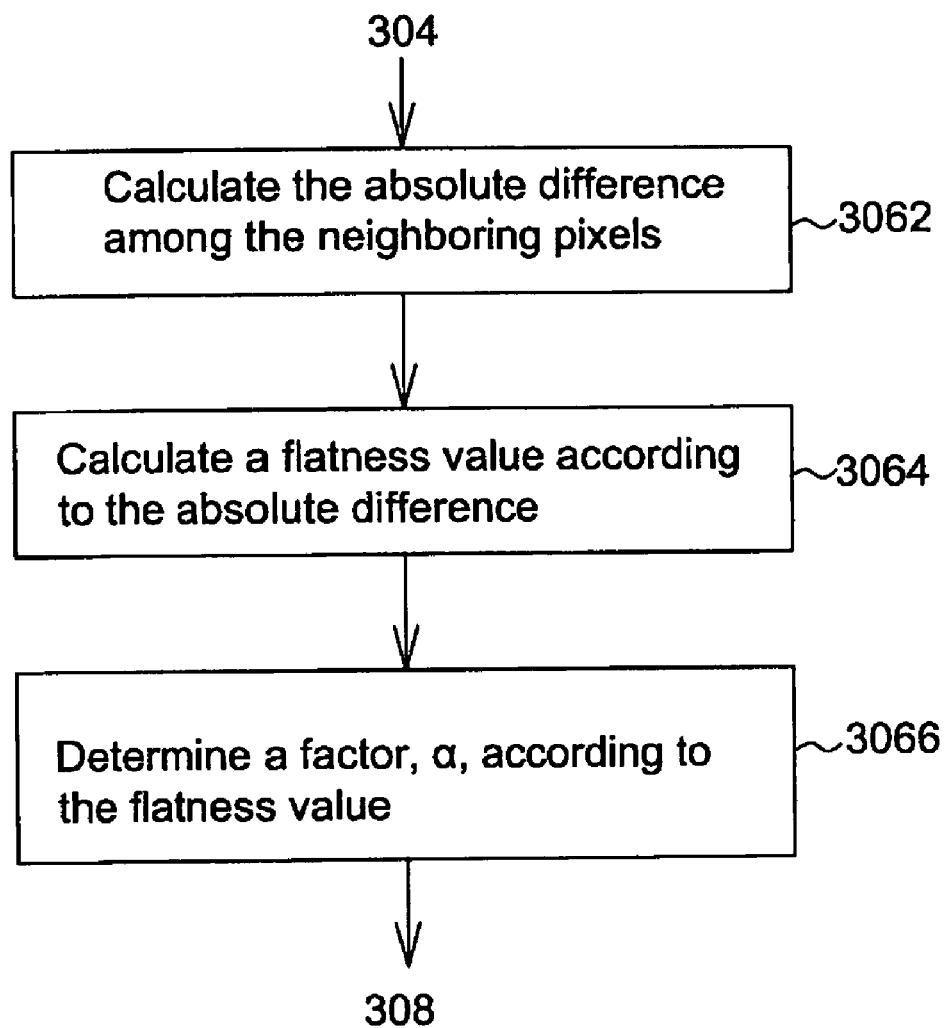
FIG. 4 is a flow chart of determining a factor α according to an embodiment of the present invention.

Step 306 may include steps 3062, 3064, and 3066 as illustrated in FIG. 4. Step 3062 calculates the absolute difference $C(i,j)$:

$$C(i,j)=|p(i,j)-AA|$$

Step 3064 determines a flatness value std according to $C(i,j)$. Preferably, each $C(i,j)$ is accumulated to get a flatness value, std:

$$std=\Sigma C(i,j)=\Sigma|p(i,j)-AA|$$

Preferably, when the flatness value std is small, it represents that the difference among the neighboring pixels is small, and therefore the image of the N×N pixel matrix is flat. Other methods known to those skilled in the art to obtain the flatness value can be also applied to the present invention.

Step 3066 determines the factor α according to the flatness value std. Preferably, the factor α is determined by referencing a look-up table according to the input flatness value std. Alternatively, the look-up table cooperates with interpolation to improve the resolution of the factor α.

After step 306, now turn to step 308, an updated pixel value A' for central pixel ((N+1)/2, (N+1)/2) is calculated. Preferably, the updated pixel value A' is calculated by applying an α blending operation, wherein A'=α*AA+(1−α)*A. A is the original pixel value for the central pixel ((N+1)/2, (N+1)/2), and the factor α is between 0 and 1.

Step 310 generates a block border signal according to the received image signal. At Step 312, alternatively output the updated pixel value or the original pixel value of the central pixel ((N+1)/2, (N+1)/2) in response to the block border signal.

To sum up, the present invention discloses an adaptively de-blocking method. First of all, an image signal is received. A mean is derived according to the neighboring pixels. A blending factor is determined according to the neighboring pixels and the mean. An updated pixel value of the central pixel is determined by blending the original pixel value of the central pixel and the mean according to the blending factor. Finally, the updated pixel value or the original pixel value of the central pixel is alternatively outputted in response to a block border signal.

While this invention has been described with reference to the illustrative embodiments, these descriptions should not be construed in a limiting sense. Various modifications of the illustrative embodiments, as well as other embodiments of the invention, will be apparent upon reference to these descriptions. It is therefore contemplated that the appended claims will cover any such modifications or embodiments as falling within the true scope of the invention and its legal equivalents.

What is claimed is:

1. An adaptively de-blocking method for operating an image signal processing circuit, comprising:
   calculating a mean for a pixel matrix;
   determining a factor according to said pixel matrix and said mean;
   calculating, according to said factor, an updated pixel value of a central pixel of said pixel matrix;
   receiving an image signal, said pixel matrix being originated from said image signal;
   generating a block border signal for said image signal; and
   alternatively outputting said updated pixel value and an original pixel value of said central pixel in response to said block border signal.

2. The method according to claim 1, wherein the step of determining said factor comprises:
   generating a flatness value according to said pixel matrix and said mean; and
   determining said factor according to said flatness value.

3. The method according to claim 2, wherein the step of determining said factor comprises:
   determining said factor by referencing a look-up table according to said flatness value.

4. The method according to claim 1, wherein the step of determining said factor comprises:
   calculating a plurality of absolute differences associated with a plurality of neighboring pixels and said central pixel;
   accumulating said absolute differences to obtain a flatness value; and
   determining said factor according to said flatness value.

5. The method according to claim 1, wherein the step of calculating said updated pixel value of said central pixel calculates said updated pixel vale by a blending said central pixel according to said factor.

6. The method according to claim 1, wherein a pixel value of each pixel of said pixel matrix represents R, G, or B value in the RGB color space, or Y, U, or V value in the YUV color space, or Y, Cr, or Cb value in the Y—Cr—Cb color space.

7. An adaptively de-blocking method for operating an image signal processing circuit, comprising:
   calculating a mean of a plurality of neighboring pixels neighboring to a central pixel;
   determining a factor according to said neighboring pixels and said mean;
   calculating, according to said factor, an updated pixel value of said central pixel; and
   alternatively outputting said updated pixel value and an original pixel value of said central pixel, in response to a block border signal.

8. The method according to claim 7, wherein the step of determining said factor comprises:
   generating a flatness value according to said neighboring pixels and said mean; and
   determining said factor according to said flatness value.

9. An adaptively de-blocking circuit, comprising:
   a memory window including a central pixel and a plurality of neighboring pixels;
   a mean calculator, coupled to said memory window, for calculating a mean, according to said neighboring pixels;
   a factor generator, coupled to said memory window and said mean calculator, for determining a factor according to said neighboring pixels and said mean; and
   a pixel-updating circuit, coupled to said factor generator, for calculating an updated pixel value of said central pixel according to said factor;
   where said factor generator comprises:
      a flatness detecting circuit, coupled to said memory window, for detecting a flatness value for said memory window; and
      a look-up table, coupled to said flatness detecting circuit, for generating said factor according to said flatness value.

10. The circuit according to claim 9, wherein said factor generator comprises:
   a difference circuit, coupled to said memory window and said mean calculator, for calculating a plurality of absolute differences associated with a plurality of neighboring pixels and said central pixel;
   an accumulator, coupled to said difference circuit, for accumulating said absolute differences to produce a flatness value; and
   a look-up table, coupled to said accumulator, for outputting said factor according to said flatness value.

11. The circuit according to claim 9, wherein said pixel-updating circuit comprises:
   an α-blending circuit for calculating said updated pixel value by a blending said central pixel according to said factor.

12. The circuit according to claim 11, comprising:
   a border detector for generating a block border signal to indicate if said central pixel lies on a block border.

13. The circuit according to claim 12, further comprising a multiplexer for receiving a current pixel value and said updated pixel value of said central pixel, and for alternatively outputting said current pixel value and said updated pixel value in response to said block border signal.

14. The circuit according to claim 9, wherein a pixel value of each pixel of said memory window represents R, G, or B value in the RGB color space, or Y, U, or V value in the YUV color space, or Y, Cr, or Cb value in the Y—Cr—Cb color space.

15. The circuit according to claim 9, said circuit being implemented in a display controller.

* * * * *